United States Patent Office 2,746,982
Patented May 22, 1956

2,746,982

PREPARATION OF SILANE ESTERS

James Franklin Hyde, Midland, Mich., assignor to Dow Corning Corporation, Midland, Mich., a corporation of Michigan No Drawing. Application February 1, 1954,
Serial No. 407,586

2 Claims. (Cl. 260—448.8)

The present invention relates to a method of preparing silane esters by the esterification of organosiloxanes.

Throughout the development of the chemistry of silicon and its compounds, a good deal of interest has centered about the silane esters. It is well known that these esters are useful in water-repellent compositions and as intermediates or raw materials in the production of silicone-alkyd type resins.

Two methods of preparing the silane esters are well known in the art. One of these methods is to react an alcohol with a chlorosilane. This reaction produces the desired esters, but it also produces HCl and water (through dehydration of the alcohol). This latter product hydrolyzes the esters, thus materially reducing the available yield of esters. Further difficulty is encountered in the removal of the HCl from the esters. Hence, this method is unsatisfactory from a commercial standpoint particularly for the nonvolatile esters because of the poor yield and the difficulty encountered in separating the acid from the esters.

A second method heretofore employed to produce silane esters involves an ester interchange. A lower alkoxy silane is reacted with a higher alcohol. The resulting ester interchange produces the desired silane esters. This latter method employs as starting materials the lower alkoxy silanes, and these materials are produced by the reaction of an alcohol with a chlorosilane as related in the preceding paragraph. Thus, all of the difficulties inherent in the method noted in the preceding paragraph are necessarily carried over to this second method. Additionally, a two-step process is involved in this second method, and it is well known in the field of commercial production of chemicals that multiple-step processes are generally more expensive in time as well as money.

The methods for preparing organosilane esters which have thus far been known and employed in the art have proved to be commercially unsatisfactory and uneconomical. It is a primary object of this invention to obviate the above-noted difficulties and to provide a relatively simple, single-step method of preparing a variety of silane esters in satisfactory yields by the esterification of organosiloxanes, which method is commercially feasible and economical. Other objects and advantages accruing from this invention are detailed in or will be apparent from the following description and the appended claims.

This invention relates to a method comprising heating and reacting an organosiloxane of the formula $$R_nSiO_{\frac{4-n}{2}}$$

where R represents monovalent hydrocarbon radicals, and $n$ has an average value of 2–3 inclusive, with an alcohol of the group consisting of primary and secondary, monohydric and dihydric alcohols having a boiling point exceeding that of isopropanol, in the presence of a catalytic amount of an alkali metal hydroxide and with the continuous removal from the reaction zone of the water formed by such reaction, whereby the siloxane is esterified to produce organosilicon esters.

The organosiloxanes which are operative in this invention are hydrocarbon-substituted siloxanes of the formula $$R_nSiO_{\frac{4-n}{2}}$$

R can be any monovalent hydrocarbon radical, for example, alkyl radicals such as methyl, ethyl, propyl, butyl, and octadecyl; alkenyl radicals such as vinyl and allyl; aryl radicals such as phenyl, naphthyl, and xenyl; alicyclic radicals such as cyclopentyl and cyclohexyl; alkaryl radicals such as tolyl and xylyl and aralkyl radicals such as benzyl. The organosiloxane must have an average of 2 to 3 monovalent hydrocarbon radicals per silicon atom, hence, the vast majority of the units must be di-substituted or tri-substituted, but minor amounts of mono-substituted organosiloxane units may be present so long as the average degree of substitution remains within the specified limits. It should be understood that R may represent the same or different hydrocarbon radicals.

For the purpose of this invention, the siloxane can be completely condensed or it can contain silicon bonded hydroxyl (—OH) groups. The molecular size of the siloxane is not critical, and the siloxanes can vary from thin fluids to solid polymers (i. e., the degree of polymerization can vary from 2 to upward of 10,000).

The alcohols which can be used in this invention are any primary and secondary, monohydric and dihydric alcohols having boiling points above that of isopropanol (i. e., above 82.5° C. at 1 atmosphere pressure). Monohydric alcohols such as, for example, the butyl alcohols, amyl alcohols, hexyl alcohols, and octadecyl alcohols; dihydric alcohols such as, for example, ethylene glycol and hexylene glycol; cyclic alcohols such as, for example, cyclohexanol and cyclopentanol; and oxygenated hydrocarbonyl alcohols such as alcohol ethers for example tripropylene glycol and the monomethyl ether of ethylene glycol, are operative in this invention. It has been found that methyl and ethyl alcohol and the tertiary alcohols are inoperative in this invention.

The relative amounts of organosiloxane and alcohol which can be reacted in this invention are not critical and can be varied at will. The specific amount of alcohol and organosiloxane to be employed is determined by the product desired. For example, with monohydric alcohols, if a monomeric silane ester is desired, 1 equivalent of alcohol should be employed for each equivalent of organosiloxane. If an organopolysiloxane ester is desired, less than 1 equivalent of alcohol should be employed per equivalent of organosiloxane. Obviously, the smaller the amount of alcohol per equivalent of silane the larger will be the polymer. Polymeric esters are also obtained when dihydric alcohols are used. Up to 15 percent by weight excess alcohol may be advantageously employed.

The reaction of the organosiloxane and alcohol is catalyzed by an alkali metal hydroxide such as lithium hydroxide, sodium hydroxide, potassium hydroxide, rubedium hydroxide, and cesium hydroxide. The catalyst is employed in minor amounts generally less than 2 percent by weight, but sufficient catalyst is necessary to maintain a pH value above 7.0 in the reaction mixture. The preferred range of catalyst is from .5 to 1 percent by weight.

The organosiloxane, alcohol, and alkali metal hydroxide may be introduced into the reaction zone by any convenient means and in any convenient order. The mixture of alcohol, organosiloxane, and catalyst is heated, and the desired silane esters are produced together with water. The reaction may be represented schematically as follows:

≡SiOSi≡ + ROH → ≡SiOR + ≡SiOH

It is, of course, desirable to remove the water (formed by condensation of ≡SiOH) as soon as possible after it is formed because the water will react with the silane ester thus materially reducing the ultimate yield of silane esters.

The removal of water from the reaction zone can be carried out by several methods, and the method employed is generally determinative of the temperature at which the reaction is carried out. The water can be removed from the reaction mixture by simply stripping it out at 100° C. or above, at atmospheric pressure or at a lower temperature representing the boiling point of water at a reduced pressure. The water can also be removed by use of a chemical reagent which is inert to the reactants in this process but which combines with the water as it is formed. Thus, calcium oxide may be employed and will combine with the water as it is formed to produce calcium hydroxide.

The temperature at which the present reaction proceeds is not critical although temperatures above 50° C. are preferred.

The preferred method for removing the water from the reaction mixture is to carry out the reaction in the presence of a hydrocarbon solvent which is immiscible with water and forms an azeotrope therewith. Such solvents as benzene, toluene, and xylene can be employed for this purpose. The desired solvent is added to the required reactants, and the reaction is carried forward at the reflux temperature of the azeotropic mixture. The distillate is condensed in a water trap from which the water may be drained and thus separated from the solvent. The temperature necessary for operating under this preferred method is, of course, the boiling point of the azeotropic solution of water and solvent.

The silane esters are useful as water repellents and as intermediates in the production of silicone-alkyd type resins. Their commercial success has long been assured, but economical means for preparing these esters will greatly extend their use.

The following examples will serve to give those skilled in the art a better understanding of this invention. All examples are merely illustrative and are not to be construed as limiting the invention, the scope of which is properly delineated in the appended claims.

*Example 1*

All parts in this and all of the examples following are parts by weight unless otherwise specified.

A Pyrex flask with a single neck was fitted with a condenser and water trap from which the water could be withdrawn and separated from any other materials condensing in the trap. 74 parts of dimethylsiloxane, (Me₂SiO)₄, were placed in the flask with 170.2 parts of n-butyl alcohol, .4 part of NaOH, and 106.5 parts of toluene. This mixture was refluxed, and the water formed was collected in the trap. The refluxing was continued until it became evident that no more water would azeotrope over into the trap. Refluxing was discontinued, the reaction mixture was filtered, and between 5 and 10 cc. of ethylene dibromide was added to the filtrate to neutralize the solution. Neutralization was accomplished at reflux temperature, and after the solution tested neutral it was again filtered to remove the sodium bromide formed during neutralization. The toluene solvent and excess butanol were then stripped off, and the reaction product was distilled. The distillate was collected and identified as di-n-butoxydimethylsilane.

*Example 2*

150 parts of 2-ethyl hexanol, 99 parts of diphenyl-siloxane, .6 part of NaOH, and 100 parts of toluene were placed in a flask fitted with a condenser and water trap described in Example 1. The mixture was heated to reflux temperature, and the water formed was collected in the trap. Refluxing was continued until the water ceased azeotroping over into the trap. The reaction mixture was filtered and neutralized by adding HCl and washing. The solution was again filtered, and the excess alcohol and toluene were stripped off under reduced pressure. The reaction product was distilled and found to be diphenyl di-2-ethyl hexoxy silane.

*Example 3*

272.7 parts of octadecanol, 68 parts of phenyl-methylsiloxane, .6 part NaOH, and 100 parts toluene were placed in a flask fitted with a water trap and condenser. The mixture was heated to refluxing temperature and refluxing continued until it became evident that substantially all of the water formed had been removed. The toluene was stripped off, and the reaction product was filtered. Ethylene dibromide was added to the filtrate, and the mixture was refluxed until neutral. The neutralized reaction product was again filtered, and the excess, unreacted alcohol was stripped off. The product was distilled and tested and found to be dioctadecyloxy-phenyl-methyl silane.

*Example 4*

Employing the method of Example 3, di-2-octyloxy dimethyl silane was prepared from 74 parts cyclic tetramer of dimethylsiloxane, 286 parts 2-octanol, 100 parts toluene, and .6 part NaOH.

*Example 5*

Employing the method of Example 3, dicyclohexyloxy diphenyl silane was prepared from 99 parts diphenyl-siloxane cyclic tetramer, 115.2 parts cyclohexanol, 100 parts toluene, and .6 part NaOH.

*Example 6*

Employing the method of Example 3, 37 parts of di-methylsiloxane cyclic tetramer, 148 parts of the mono-ethylether of tripropylene glycol were reacted in a solution of 150 parts of benzene and .6 part NaOH. A mono-ethylether-tripropoxy ester of dimethyl silane was obtained.

*Example 7*

Employing the method of Example 3, dimeric di-methylethylene dioxy silane $$(-\underset{Me_2}{Si}OCH_2CH_2O)_2$$

was prepared from 148 parts of the cyclic tetramer of dimethyl siloxane, 262.4 parts of ethylene glycol, 150 parts benzene and .6 part NaOH.

*Example 8*

Employing the method of Example 3, dimethyl di-n-propoxy silane was prepared from 74 parts of the cyclic tetramer of dimethyl siloxane, 125 parts n-propyl alcohol, 150 parts benzene and .6 part NaOH.

That which is claimed is:

1. A method comprising reacting an organosiloxane of the formula $$R_nSiO_{\frac{4-n}{2}}$$

where R represents a monovalent hydrocarbon radical, and $n$ has an average value of 2–3 inclusive, with an alcohol of the group consisting of primary and secondary monohydric and dihydric alcohols which have boiling points exceeding that of isopropanol, by heating them in the presence of a catalytic amount of an alkali metal hydroxide with continuous removal from the reaction zone of the water formed by the reaction, whereby the siloxane is esterified to produce organosilicon esters.

2. A method comprising reacting an organosiloxane of the formula $$R_nSiO_{\frac{4-n}{2}}$$

where R represents a monovalent hydrocarbon radical, and $n$ has an average value of 2–3 inclusive, with an alcohol of the group consisting of primary and secondary monohydric and dihydric alcohols which have boiling points exceeding that of isopropanol, by heating them in the presence of a catalytic amount of an alkali metal hydroxide and a hydrocarbon solvent with the continuous azeotropic removal from the reaction zone of the water formed by the reaction, whereby the siloxane is esterified to produce organosilicon esters.

References Cited in the file of this patent

UNITED STATES PATENTS

| | | |
|---|---|---|
| 2,415,389 | Hunter et al. | Feb. 4, 1947 |
| 2,658,908 | Nitzsche et al. | Nov. 10, 1953 |